Nov. 17, 1959 B. M. BENTON 2,913,599

BI-STABLE FLIP-FLOPS

Filed Jan. 27, 1958

INVENTOR.
BRUCE M. BENTON

BY K. H. Thomas

ATTORNEY

United States Patent Office 2,913,599

Patented Nov. 17, 1959

2,913,599

BI-STABLE FLIP-FLOPS

Bruce M. Benton, Bellevue, Wash., assignor to Boeing Airplane Company, Seattle, Wash., a corporation of Delaware Application January 27, 1958, Serial No. 711,240

6 Claims. (Cl. 307—88.5)

This invention relates to bi-stable flip-flops and more particularly to such flip-flops of the transistorized type in which means is provided to insure a more positive action of the flip-flop.

Heretofore various types of transistorized flip-flops have been provided. However, these prior art flip-flops have certain disadvantages. For instance, when a gradually increasing or decreasing signal is utilized to control the operation of the flip-flop the flip-flop tends to hover when going from one operating state to the other. In other words, in these prior art flip-flops the speed of response in going from one state of operation to the other state of operation is relatively slow and thus the flip-flop does not have a positive action. Further, once many of these prior art flip-flops have assumed a given state of operation they are not very stable in remaining in that particular state of operation.

Therefore, an object of this invention is to provide for increasing the positive action of a flip-flop in going from one state of operation to the other when a gradual varying control signal is applied thereto.

Another object of this invention is to provide for increasing the speed of response of a flip-flop in going from one state of operation to the other irrespective of the characteristic of the control signal applied to the flip-flop.

A further object of this invention is to provide for insuring what state of operation a flip-flop assumes when the supply voltage is applied to the flip-flop.

An additional object of this invention is to provide improved means for controlling the magnitude of the dead-band of the flip-flop over relatively wide limits.

Another object of this invention is to provide for increasing the stability of the selective mode of a flip-flop.

A more specific object of this invention is to provide in a flip-flop for effecting a signal that is accumulative with the input control signal and applying the accumulated signal to a Zener diode that is so interconnected with the other components of the flip-flop that a positive action is obtained for the flip-flop in going from one operating state to the other operating state.

Figure 1:
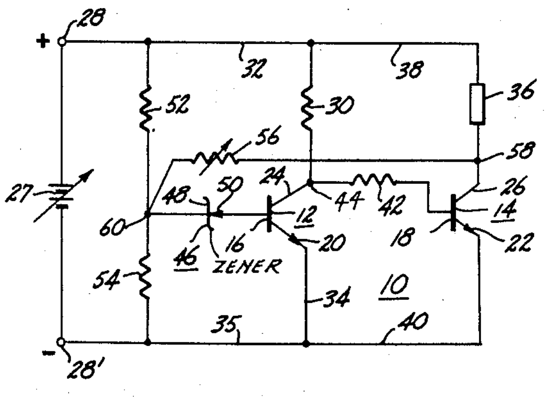
Figure 2:
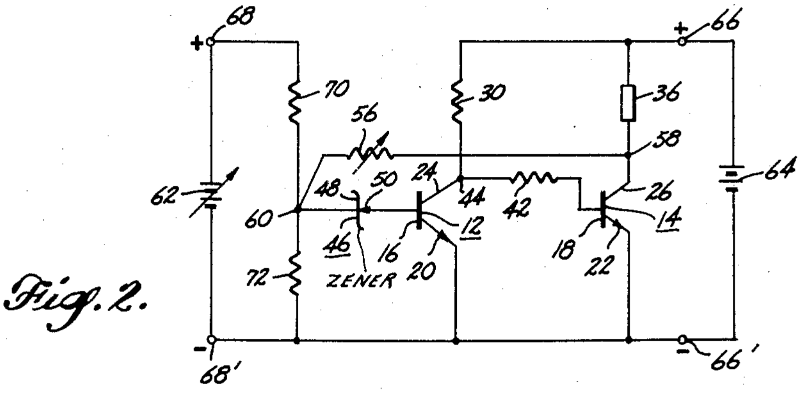

Other objects of this invention will become apparent from the following description when taken in conjunction with the accompanying drawing in which:

Fig. 1 is a schematic diagram of circuits and apparatus illustrating an embodiment of the teachings of this invention, and Fig. 2 is a schematic diagram of circuits and apparatus illustrating another embodiment of the teachings of this invention.

Referring to Fig. 1 there is illustrated a transistorized flip-flop 10 embodying teachings of this invention. The flip-flop 10 comprises two semi-conductor devices, specifically two N-P-N junction-type transistors 12 and 14. Each of the transistors 12 and 14 includes a control electrode and two power electrodes, specifically base electrodes 16 and 18, respectively, emitter electrodes 20 and 22, respectively, and collector electrodes 24 and 26, respectively.

In order to effect both control current and power current for the transistors 12 and 14 a comon variable source 27 of control and supply voltage is connected to the terminals 28 and 28', the common source 27 being so connected to the terminals 28 and 28' as to effect a polarity as shown in Fig. 1. The circuit means for effecting a flow of power current through the transistor 12 includes a resistor 30 and electrical conductors 32, 34 and 35, the resistor 30 functioning to limit the flow of power current through the transistor 12 when it is in the conducting state. On the other hand, the circuit means for effecting a flow of power current through the transistor 14 includes a load 36 and electrical conductors 38 and 40.

Control current for the transistor 14 is supplied through a circuit which includes the electrical conductor 32, the current-limiting resistor 30, a resistor 42, and the electrical conductors 40 and 35. In operation, the resistor 42 functions to determine the gain of the flip-flop 10. As shown in Fig. 1, the resistor 42 is interconnected between the collector electrode 24, of the transistor 12, and the base electrode 18, of the transistor 14. With the resistor 42 so connected the transistor 14 is rendered responsive to the operation of the transistor 12. In other words, as will be explained more fully hereinafter, when the transistor 12 is conductive the point 44 is at such a potential as to maintain the transistor 14 in a non-conductive state and when the transistor 12 is rendered non-conductive the potential of the point 44 increases to such a value as to render the transistor 44 conductive.

In order to control the conductivity of the control current for the transistor 12 a voltage reference diode, specifically a semi-conductor diode having a preassigned Zener voltage such as a Zener diode 46 having a negative terminal 48 and a positive terminal 50, is interconnected with the common source 27 and with the base electrode 16, of the transistor 12. Specifically, the positive terminal 50, of the Zener diode 46 is connected to the base electrode 16, of the transistor 12, to thus form a series circuit including the Zener diode 46 and the base electrode 16 and the emitter electrode 20, of the transistor 12, the end of the series circuit including the negative terminal 48, of the Zener diode 46, being connected to the positive side of the common source 27 through a voltage-divider resistor 52 and the terminal 28, and the other side of the series circuit being connected to the negative side of the common source 27 through the electrical conductors 34 and 35, and the terminal 28'. As will be explained more fully hereinafter, once the magnitude of the voltage across the terminals 28 and 28' is increased to such value as to effect a voltage of sufficient magnitude across a voltage-divider resistor 54 the Zener diode 46 conducts Zener current to thereby render the transistor 12 conductive. The characteristic of the voltage reference diode or Zener diode 46 is such that once the back voltage across the Zener diode 46 is sufficient to effect a conduction of Zener current through the Zener diode 46 the reverse or back voltage across the Zener diode 46 remains substantially constant, however, a tendency to increase the back voltage across the Zener diode 46 increases the magnitude of the Zener current through the Zener diode 46.

For the purpose of providing a variable dead-band for the flip-flop 10 an impedance member, specifically a variable resistor 56 is interconnected between the negative terminal 48, of the Zener diode 46, and the collector electrode 26, of the transistor 14. In the specific embodiment shown in Fig. 1 the voltage-divider resistors 52 and 54 actually cooperate with the variable resistor 56 and the Zener diode 46 to effect this dead-band for the flip-flop 10. However, the voltage-divider resistor 52 can be omitted and a direct connection substituted therefore and the voltage-divider resistor 54 can be completely taken out of the circuit. Thus, the variable resistor 56 of itself connected as shown in cooperation with the Zener diode 46 can effect the variable dead-band provided the common source 27 does not have essentially zero internal impedance. It is to be noted that with the variable resistor 56 interconnected between the negative terminal 48, of the Zener diode 46, and the collector electrode 26, of the transistor 14, the common source 27 is able to vary the magnitude of the back voltage across the Zener diode 46 to thereby control the on-off operation of the transistor 12. If the connection between the collector electrode 26 and the negative terminal 48 were a direct one it would not be possible to vary the magnitude of the back voltage across the Zener diode 46 when the transistor 14 is in the conducting state since the negative terminal 48, of the Zener diode 46, would be directly connected to the negative side of the common source 27 through the collector electrode 26, the emitter electrode 22, of the transistor 14, and the electrical conductors 40 and 35.

The connection between points 58 and 60 which includes the variable resistor 56 in addition to providing a variable dead-band for the flip-flop 10 also functions to effect a signal that is accumulative with the control signal produced by the common source 27, both of which are applied across the sensing Zener diode 46, to thus increase the speed of response of the flip-flop 10 in going from one mode of operation to the other, to thereby render the flip-flop action more positive. On the other hand, the Zener diode 46 also functions to insure what state of operation the flip-flop assumes when the supply voltage is applied thereto. In addition, the Zener diode 46 in cooperation with the variable resistor 56 increases the stability of the selective mode of the flip-flop 10.

The operation of the flip-flop 10 will now be described. Assuming the voltage across the terminals 28 and 28' and thus the voltage across the voltage-divider resistor 54 is insufficient to effect a breakdown of the Zener diode 46 then the transistor 14 is conductive and the transistor 12 is non-conductive. Under these conditions control current flows from the terminal 28 through the current-limiting resistor 30, the resistor 42, the base electrode 18, the emitter electrode 22, of the transistor 14, and the electrical conductors 40 and 35, to the terminal 28'. Simultaneously power current flows from the terminal 28 through the electrical conductors 32 and 38, the load 36, the collector electrode 26, the emitter electrode 22, of the transistor 14, and the electrical conductors 40 and 35, to the terminal 28'. At the same time current also flows from the terminal 28 through the voltage-divider resistor 52, the variable resistor 56, the collector electrode 26, the emitter electrode 22, of the transistor 14, and the electrical conductors 40 and 35, to the terminal 28'. There is also a path for the flow of current from the terminal 28 through the voltage-divider resistors 52 and 54 to the terminal 28'.

On increase in the magnitude of the voltage across the terminals 28 and 28' a level is reached at which the back voltage across the Zener diode 46 is of sufficient magnitude to effect a conduction of Zener current through the Zener diode 46, to thereby effect a flow of control current from the terminal 28 through the voltage-divider resistor 52, the Zener diode 46, the base electrode 16, the emitter electrode 20, of the transistor 12, and the electrical conductors 34 and 35, to the terminal 28'. This latter action causes the transistor 12 to start to conduct power current thereby decreasing the magnitude of the potential at the point 44. A decrease in the magnitude of the potential at the point 44 decreases the magnitude of the control current flowing through the transistor 14, thus decreasing the magnitude of the flow of power current through the transistor 14. When this occurs the potential at the point 58 increases to thereby decrease the magnitude of the current flow through the variable resistor 56 toward the point 58, to thus tend to increase the magnitude of the back-voltage across the Zener diode 46 and thereby increase the magnitude of the Zener current flowing through the Zener diode 46. Thus, this decrease in current flow through the variable resistor 56 acts accumulatively with the control signal received from the terminals 28 and 28' to bring about a further breakdown of the Zener diode 46. Therefore, the speed of response in going from a state of operation in which the transistor 12 is non-conductive and the transistor 14 is conductive to a state of operation in which the transistor 12 is conductive and the transistor 14 is non-conductive is increased due to this accumulative effect being sensed by the Zener diode 46. Thus, a more positive action of the flip-flop 10 is obtained in going from one state of operation to the other.

When the transistor 12 becomes still more conductive the point 44 assumes a still more negative potential thus effecting a lower magnitude of power current flow through the transistor 14, to thereby further increase the potential at the point 58. Finally a level is reached at which the potential at the point 58 is higher than the potential at the point 60. When this occurs control current flows from the terminal 28 through the electrical conductors 32 and 38, the load 36, the point 58, the variable resistor 56, the point 60, and the voltage-divider resistor 54, to the terminal 28'. This latter action also acts accumulatively with the control signal received from the terminals 28 and 28' to thereby tend to further increase the magnitude of the back-voltage across the Zener diode 46. In addition, the characteristic of the Zener diode is such that once it starts to conduct Zener current a relatively small increase in the magnitude of the back-voltage produces a relatively large increase in the magnitude of the Zener current flowing through the Zener diode 46.

With the transistor 12 conductive and the transistor 14 non-conductive the magnitude of the voltage across the terminals 28 and 28' must be reduced in order to render the transistor 12 non-conductive and the transistor 14 conductive. As was explained hereinbefore, the magnitude of the voltage across the voltage-divider resistor 54 must be increased to a given value before the transistor 12 becomes conductive, however, in order to render the transistor 12 non-conductive the voltage across the voltage-divider resistor 54 must be decreased to a value below said given value. In practice, the larger the in-circuit resistance value of the variable-resistor 56 the smaller is the dead-band. In fact, if the in-circuit resistance value of the variable-resistor 56 is decreased to zero it would not be possible to render the transistor 12 conductive assuming the transistor 14 is in the conductive state and the saturating voltage of the transistor 14 is below the breakdown voltage of the Zener diode 46.

The reason the dead-band occurs is that with the transistor 14 in the conductive state power current flows from the terminal 28 through the voltage-divider resistor 52, the variable-resistor 56, the collector electrode 26, the emitter electrode 22, of the transistor 14, and the electrical conductors 40 and 35, to the terminal 28'. Thus, part of the current from the common source 27 is shunted away from the voltage-divider resistor 54. Therefore, in order to sufficiently increase the potential at the point 60 and thus render the transistor 12 conductive the voltage across the terminals 28 and 28' must be increased to a greater extent in order to overcome this shunting effect. On the other hand, once the transistor 12 is conducting power current and it is desired to render the transistor 12 non-conductive the voltage across the terminals 28 and 28' must be reduced to a greater extent in order to overcome the shunting control current flowing from the terminal 28 through the electrical conductors 32 and 38, the load 36, the point 58, the variable-resistor 56, the point 60, and the voltage-divider resistor 54, to the terminal 28'.

Assuming the transistor 12 is conducting power current and it is desired to render the transistor 12 non-conductive then the magnitude of the voltage across the terminals 28 and 28' is decreased thus decreasing the magnitude of the Zener current flowing through the Zener diode 46. When this occurs the potential at the point 44 starts to increase to thereby effect a flow of control current from the terminal 28 through the electrical conductor 32, the current-limiting resistor 30, the resistor 42, the base electrode 18, the emitter electrode 22, of the transistor 14, and the electrical conductors 40 and 35, to the terminal 28', to thereby render the transistor 14 partially conductive. Power current then starts to flow from the terminal 28 through the electrical conductors 32 and 38, the load 36, the collector electrode 26, the emitter electrode 22, of the transistor 14, and the electrical conductors 40 and 35, to the terminal 28'. This decreases the potential at the point 58 and thus less current flows through the variable-resistor 58 toward the point 60. Therefore, this latter action acts accumulatively with the decrease in the magnitude of the control signal appearing across the terminals 28 and 28', to thus tend to decrease the potential at the point 60, to thereby further decrease the Zener current flowing through the Zener diode 46 and thereby increase the speed of response in rendering the transistor 12 non-conductive and the transistor 14 conductive.

During this latter change in mode of operation a level is reached at which the point 58 is at a lesser potential than the point 60 and at this time the current flow through the variable-resistor 56 reverses and current flows through the variable-resistor 56 toward the point 58. This latter action also acts accumulatively with the decrease in the control signal appearing across the terminals 28 and 28' to thus further decrease the magnitude of the Zener current flowing through the Zener diode 46. Finally the transistor 12 becomes non-conductive and the transistor 14 becomes fully conductive.

Referring to Fig. 2 there is illustrated another embodiment of the teachings of this invention in which like components of Figs. 1 and 2 have been given the same reference characters. The main distinction between the apparatus and circuits of Figs. 1 and 2 is that in the apparatus and circuits of Fig. 2 a separate variable control source 62 and a separate power source 64 is provided. As illustrated, the power source 64 is connected across terminals 66 and 66' which have a polarity as shown in the drawing. On the other hand, the control source 62 is connected to terminals 68 and 68' which have a polarity as shown in the drawing. Resistors 70 and 72 function as voltage-divider resistors and cooperate with the variable-resistor 56 and the Zener diode 46 in a manner similar to the way the voltage-divider resistors 52 and 54 of Fig. 1 cooperate with their associated variable-resistor 56 and Zener diode 46. Here again, the voltage-divider resistor 72 may be totally eliminated and the voltage-divider resistor 70 may be omitted and a direct electrical connection substituted therefore provided the control source 62 does not have essentially zero internal impedance.

In operation, the power source 64 should be regulated from the standpoint of output voltage, otherwise variations in the output voltage of the power source 64 would be reflected to the point 60 thus effecting the operational effect of the control source 62. Since the operation of the apparatus and circuits of Fig 2 is similar to the operation of the apparatus and circuits of Fig. 1 a description of such operation is deemed unnecessary.

It is to be understood that other types of semi-conductor devices such as P-N-P junction transistors could be substituted for the N-P-N junction transistors 12 and 14 of Figs. 1 and 2, however, as is well understood in the art the polarity of the sources 27, 62 and 64 would have to be reversed and the polarity of Zener diode 46 in the circuit would also have to be reversed.

The apparatus and circuits embodying the teachings of this invention have several advantages. For instance, apparatus and circuits constructed in accordance with this invention have a higher speed of response in going from one state or mode of operation to the other and thus the apparatus and circuits have a more positive action. In addition, means are provided for insuring what state of operation the flip-flop assumes when the supply or power voltage is applied to the flip-flop. The stability of the selected mode of the flip-flop is also increased. Further, means are provided for controlling the magnitude of the dead-band of the flip-flop over wide limits while still maintaining the previously mentioned advantages.

Since numerous changes may be made in the above apparatus and circuits and different embodiments may be made without departing from the spirit and scope thereof, it is intended that all matter contained in the foregoing description or shown in the accompanying drawing shall be interpreted as illustrative and not in a limiting sense.

I claim as my invention:

1. In a flip-flop adapted to be connected to a control source, the combination comprising, a first and a second transistor, each of which includes a base electrode, an emitter electrode and a collector electrode, circuit means for effecting a flow of power current through the collector electrode and the emitter electrode of each of said transistors, other circuit means, interconnected between the collector electrode of the first transistor and the base electrode of the second transistor, for rendering the conductivity of the second transistor dependent upon the conductivity of the first transistor, a voltage reference diode having two terminals, further circuit means for electrically connecting one of the two terminals of the voltage reference diode to the base electrode of the first transistor and for electrically connecting the other of the two terminals of the voltage reference diode to said control source so that the conductivity of the voltage reference diode in the reverse direction effects a flow of control current through the base electrode and the emitter electrode of the first transistor, and still further distinct circuit means for electrically interconnecting an impedance member between said other of the two terminals of the voltage reference diode and the collector electrode of the second transistor so as to provide a dead-band for the flip-flop and accumulative control action for the voltage reference diode while permitting said control source to vary the magnitude of the back-voltage across the voltage reference diode below the breakdown voltage of the voltage reference diode.

2. In a flip-flop adapted to be connected to a control source, the combination comprising, a first and a second transistor, each of which includes a base electrode, an emitter electrode and a collector electrode, circuit means for effecting a flow of power current through the collector electrode and the emitter electrode of each of said transistors, other cricuit means, connected between the collector electrode of the first transistor and the base electrode of the second transistor, for rendering the conductivity of the second transistor dependent upon the conductivity of the first transistor, a Zener diode having two terminals, further circuit means for electrically connecting one of the two terminals of the Zener diode to the base electrode of the first transistor and for electrically connecting the other of the two terminals of the Zener diode to said control source so that the conductivity of the Zener diode in the reverse direction effects a flow of control current through the base and emitter electrodes of the first transistor, and still further distinct circuit means for electrically interconnecting a variable resistor between said other of the two terminals of the Zener diode and the collector electrode of the second transistor so as to provide a dead-band for the flip-flop and accumulative control action for the Zener diode while permitting said control source to vary the magnitude for the back-voltage across the Zener diode below the break-down voltage of the Zener diode.

3. In a flip-flop adapted to be connected to a common source of control and supply voltage, the combination comprising, a first and a second transistor, each of which includes a base electrode, a collector electrode and an emitter electrode, circuit means, interconnected with said common source, for effecting a flow of power current through the collector electrode and the emitter electrode of each of said transistors, other circuit means electrically interconnected between the collector electrode of the first transistor and the base electrode of the second transistor, for rendering the conductivity of the second transistor dependent upon the conductivity of the first transistor, said other circuit means also being electrically interconnected with said common source for effecting a flow of control current through the base electrode and the emitter electrode of the second transistor, a voltage reference diode having two terminals, further circuit means for electrically connecting one of the two terminals of the voltage reference diode to the base electrode of the first transistor and for electrically connecting the other of the two terminals of the voltage reference diode to said common source so that the conductivity of the voltage reference diode in the reverse direction effects a flow of control current through the base electrode and the emitter electrode of the first transistor, and still further distinct circuit means for electrically interconnecting an impedance member between said other of the two terminals of the voltage reference diode and the collector electrode of the second transistor so as to provide a dead-band for the flip-flop and accumulative control action for the voltage reference diode while permitting said common source to vary the magnitude of the back-voltage across the voltage reference diode below the breakdown voltage of the voltage reference diode.

4. In a flip-flop adapted to be connected to a common source of control and supply voltage, the combination comprising, a first and a second transistor, each of which includes a base electrode, an emitter electrode and a collector electrode, circuit means, interconnected with said common source, for effecting a flow of power current through the collector electrode and the emitter electrode of each of said transistors, other circuit means, interconnected between the collector electrode of the first transistor and the base electrode of the second transistor, for rendering the conductivity of the second transistor dependent upon the conductivity of the first transistor, said other circuit means also being electrically interconnected with said common source for effecting a flow of control current through the base electrode and the emitter electrode of the second transistor, a Zener diode having two terminals, further circuit means for electrically connecting one of the two terminals of the Zener diode to the base electrode of the first transistor and for electrically connecting the other of the two terminals of the Zener diode to said common source so that the conductivity of the Zener diode in the reverse direction effects a flow of control current through the base electrode and the emitter electrode of the first transistor, and still further distinct circuit means for electrically interconnecting a variable resistor between said other of the two terminals of the Zener diode and the collector electrode of the second transistor so as to provide a dead-band for the flip-flop and accumulative control action for the Zener diode while permitting said common source to vary the magnitude of the back-voltage across the Zener diode below the break-down voltage of the Zener diode.

5. In a flip-flop adapted to be connected to a separate control source and a separate power source, the combination comprising, a first and a second transistor each of which includes a base electrode, an emitter electrode and a collector electrode, circuit means, interconnected with said power source, for effecting a flow of power current through the emitter electrode and the collector electrode of each of said transistors, other circuit means, connected between the collector electrode of the first transistor and the base electrode of the second transistor, for rendering the conductivity of the second transistor dependent upon the conductivity of the first transistor, said other circuit means also being electrically interconnected with said power source for effecting a flow of control current through the base electrode and the emitter electrode of the second transistor, a voltage reference diode having two terminals, further circuit means for electrically connecting one of the two terminals of the voltage reference diode to the base electrode of the first transistor and for electrically connecting the other of the two terminals of the voltage reference diode to said control source so that the conductivity of the voltage reference diode in the reverse direction effects a flow of control current through the base electrode and the emitter electrode of the first transistor, and still further distinct circuit means for electrically interconnecting an impedance member between said other of the two terminals of the voltage reference diode and the collector electrode of the second transistor so as to provide a dead-band for the flip-flop and accumulative control action for the voltage reference diode while permitting said control source to vary the magnitude of the back-voltage across the voltage reference diode below the break-down voltage of the voltage reference diode.

6. In a flip-flop adapted to be connected to a separate control source and a separate power source, the combination comprising, a first and a second transistor, each of which includes a base electrode, an emitter electrode and a collector electrode, circuit means, interconnected with said power source for effecting a flow of power current through the collector electrode and the emitter electrode of each of said transistors, other circuit means, interconnected between the collector electrode of the first transistor and the base electrode of the second transistor for rendering the conductivity of the second transistor dependent upon the conductivity of the first transistor, said other circuit means also being electrically interconnected with said power source for effecting a flow of control current through the base electrode and the emitter electrode of the second transistor, a Zener diode having two terminals, further circuit means for electrically connecting one of the two terminals of the Zener diode to the base electrode of the first transistor and for electrically connecting the other of the two terminals of the Zener diode to said control source so that the conductivity of the Zener diode in the reverse direction effects a flow of control current through the base electrode and the emitter electrode of the first transistor, and still further distinct circuit means for electrically interconnecting a variable resistor between said other of the two terminals of the Zener diode and the collector electrode of the second transistor so as to provide a dead-band for the flip-flop and accumulative control action for the Zener diode while permitting said control source to vary the magnitude of the back-voltage across the Zener diode below the break-down voltage of the Zener diode.

References Cited in the file of this patent

UNITED STATES PATENTS

| | | |
|---|---|---|
| 2,820,155 | Linvill | Jan. 14, 1958 |
| 2,831,986 | Summer | Apr. 22, 1958 |
| 2,832,900 | Ford | Apr. 29, 1958 |

OTHER REFERENCES

Linvill: Nonsaturating Pulse Circuit Using Two Junction Transistors, July 1955.